United States Patent
Ruiter et al.

(10) Patent No.: US 8,196,864 B2
(45) Date of Patent: Jun. 12, 2012

(54) SEATING ARRANGEMENTS PARTICULARLY FOR PASSENGER AIRCRAFT

(75) Inventors: Adrianus W. N. Ruiter, Denton, TX (US); Paul Bentley, Gainesville, TX (US)

(73) Assignee: Weber Aircraft LLC, Gainesville, TX (US)

( * ) Notice: Subject to any disclaimer, the term of this patent is extended or adjusted under 35 U.S.C. 154(b) by 454 days.

(21) Appl. No.: 12/584,446

(22) Filed: Sep. 4, 2009

(65) Prior Publication Data

US 2010/0065684 A1   Mar. 18, 2010

Related U.S. Application Data

(60) Provisional application No. 61/191,183, filed on Sep. 5, 2008.

(51) Int. Cl.
B64D 11/06 (2006.01)

(52) U.S. Cl. .................................. 244/118.6

(58) Field of Classification Search ............... 244/118.6, 244/118.5; 105/315; 297/232
See application file for complete search history.

(56) References Cited

U.S. PATENT DOCUMENTS

| | | | |
|---|---|---|---|
| 4,936,620 A * | 6/1990 | Francois et al. | 296/64 |
| D421,948 S | 3/2000 | Dryburgh | |
| 6,227,489 B1 | 5/2001 | Kitamoto et al. | |
| 6,663,173 B1 | 12/2003 | Corfitsen | |
| 6,669,141 B2 * | 12/2003 | Schmidt-Schaeffer | 244/118.6 |
| 7,025,306 B2 * | 4/2006 | Saint Jalmes | 244/118.6 |
| 7,156,346 B2 | 1/2007 | Mercier | |
| 7,188,806 B2 * | 3/2007 | Beroth | 244/122 R |
| 7,320,446 B2 * | 1/2008 | Saint-Jalmes et al. | 244/118.6 |
| 7,523,888 B2 | 4/2009 | Ferry et al. | |
| 7,578,470 B2 * | 8/2009 | Plant | 244/118.6 |
| 7,578,471 B2 * | 8/2009 | Beroth | 244/118.6 |
| 7,721,990 B2 * | 5/2010 | Jaeger et al. | 244/118.6 |
| 2009/0146004 A1 | 6/2009 | Plant | |

FOREIGN PATENT DOCUMENTS

| | | |
|---|---|---|
| EP | 0869061 | 10/1998 |
| EP | 1043225 | 10/2000 |
| EP | 1044878 | 10/2000 |
| FR | 647809 | 12/1928 |
| GB | 2362095 | 11/2001 |
| WO | WO2005014395 | 2/2005 |

OTHER PUBLICATIONS

Britax Aircraft Interiors Limited, P10225-001, P10285-001, Component Maintenance Manual With Illustrated Parts List (pages are marked with various dates prior to Aug. 1, 2001).

* cited by examiner

*Primary Examiner* — Christopher P Ellis
(74) *Attorney, Agent, or Firm* — Dean W. Russell; Kilpatrick Townsend & Stockton LLP

(57) ABSTRACT

Seating arrangements for passenger aircraft or other vehicles are detailed. Some arrangements position seats at offsets from a longitudinal axis of a vehicle cabin in either "V" shapes or herringbone patterns. Other arrangements include seats that are staggered within the cabin. Further arrangements include pairs of seat that are both parallel and offset from the longitudinal axis, but are placed so that feet of the port and starboard passengers point away from the fuselage. All embodiments contemplate providing seats that are convertible to beds, although this conversion is not required.

11 Claims, 4 Drawing Sheets

SEATING ARRANGEMENTS PARTICULARLY FOR PASSENGER AIRCRAFT

REFERENCE TO PROVISIONAL APPLICATION

This application is based on, claims priority to, and hereby refers to U.S. Provisional Patent Application Ser. No. 61/191,183, filed Sep. 5, 2008, entitled "Parallel Angled Seat Configuration," the entire contents of which are incorporated herein by this reference.

FIELD OF THE INVENTION

This invention relates to arrangements of seats and more particularly, although not necessarily exclusively, to seating arrangements within cabins of aircraft or other passenger vehicles.

BACKGROUND OF THE INVENTION

Commercial aircraft, especially passenger airplanes, often contain multiple seats in one or more cabins within the aircraft fuselage. Subject to their compliance with applicable safety regulations, seating arrangements may vary from airplane to airplane. Whereas passengers may prefer fewer seats per cabin to increase leg-room, privacy, or other proxies for decreased seat density, airplane operators may prefer greater seats per cabin to increase revenue for each flight. Further, depending on sizes and shapes of both seats and cabins, differing arrangements of seats may be preferred. Optimizing, or at least enhancing, both passenger comfort and revenue generation is a significant issue in cabin design and layout.

Disclosed in U.S. Pat. No. 7,156,346 to Mercier is an arrangement of seats convertible into beds. The seats are disposed in parallel rows extending longitudinally within an aircraft. Rows are grouped in pairs, separated by aisles.

U.S. Pat. No. 6,663,173 to Corfitsen also discloses an arrangement of seats convertible into beds. The seats again form rows extending longitudinally within an aircraft. When converted to beds, however, passengers rest "one above the other."

U.S. Patent Application Publication No. 2009/0146004 of Plant illustrates yet another arrangement of aircraft seats convertible into beds. Unlike those of the Mercier and Corfitsen patents, the seats of the Plant application are angled relative to a longitudinal axis of the cabin. Pairs of seats are typically offset approximately ±15° from the longitudinal axis, and feet of the passengers of the port and starboard pairs of seats point toward the fuselage. The contents of the Mercier and Corfitsen patents and of the Plant application are incorporated herein in their entireties by this reference.

SUMMARY OF THE INVENTION

The present invention provide alternate seating arrangements to those of the foregoing patents and application. Various embodiments of the arrangements position seats at offsets from a longitudinal axis of a vehicle cabin. Unlike the seats of the Plant application, however, some of those of the prevent invention—while offset from the longitudinal axis—are not placed in parallel pairs. Instead, they are positioned generally in "V" shapes or in herringbone patterns. Other embodiments of paired seating arrangements are not offset from the longitudinal axis but rather are staggered throughout the cabin. Yet other versions of the invention include pairs of seat that are both parallel and offset from the longitudinal axis, but are placed so that feet of the port and starboard passengers point away from the fuselage. All embodiments contemplate providing seats that are convertible to beds, although this conversion is not required.

By contrast with conventional, longitudinally-oriented seat frames, many of those of the present invention may be positioned at angles to longitudinal axes (as noted above). As a result, the structures of the present invention may be lighter and less complex than many existing products. Lighter seating structures are especially valuable in the aircraft industry, as less fuel is required to convey the lighter structures from place to place.

It thus is an optional, non-exclusive object of the present invention to provide seats for passenger vehicles such as (but not necessarily limited to) aircraft.

It is another optional, non-exclusive object of the present invention to provide seats configured for arrangements in various ways within vehicle cabins.

It is also an optional, non-exclusive object of the present invention to provide seats convertible into beds.

It is a further optional, non-exclusive object of the present invention to provide arrangements of seats within passenger vehicle cabins.

It is, moreover, an optional, non-exclusive object of the present invention to provide arrangements of seats in which pairs may be positioned in a "V" shape or in a herringbone pattern.

It is yet another optional, non-exclusive object of the present invention to provide arrangements of seats in which pairs are staggered laterally.

It is an additional optional, non-exclusive object of the present invention to provide arrangements of seats in which feet of port and starboard passengers point away from the fuselage (or frame) of the vehicle.

Other features, advantages, and objects of the present invention will be apparent to those skilled in appropriate fields with reference to the remaining text and drawings of this application.

BRIEF DESCRIPTION OF THE INVENTION

DETAILED DESCRIPTION

Figure 1:
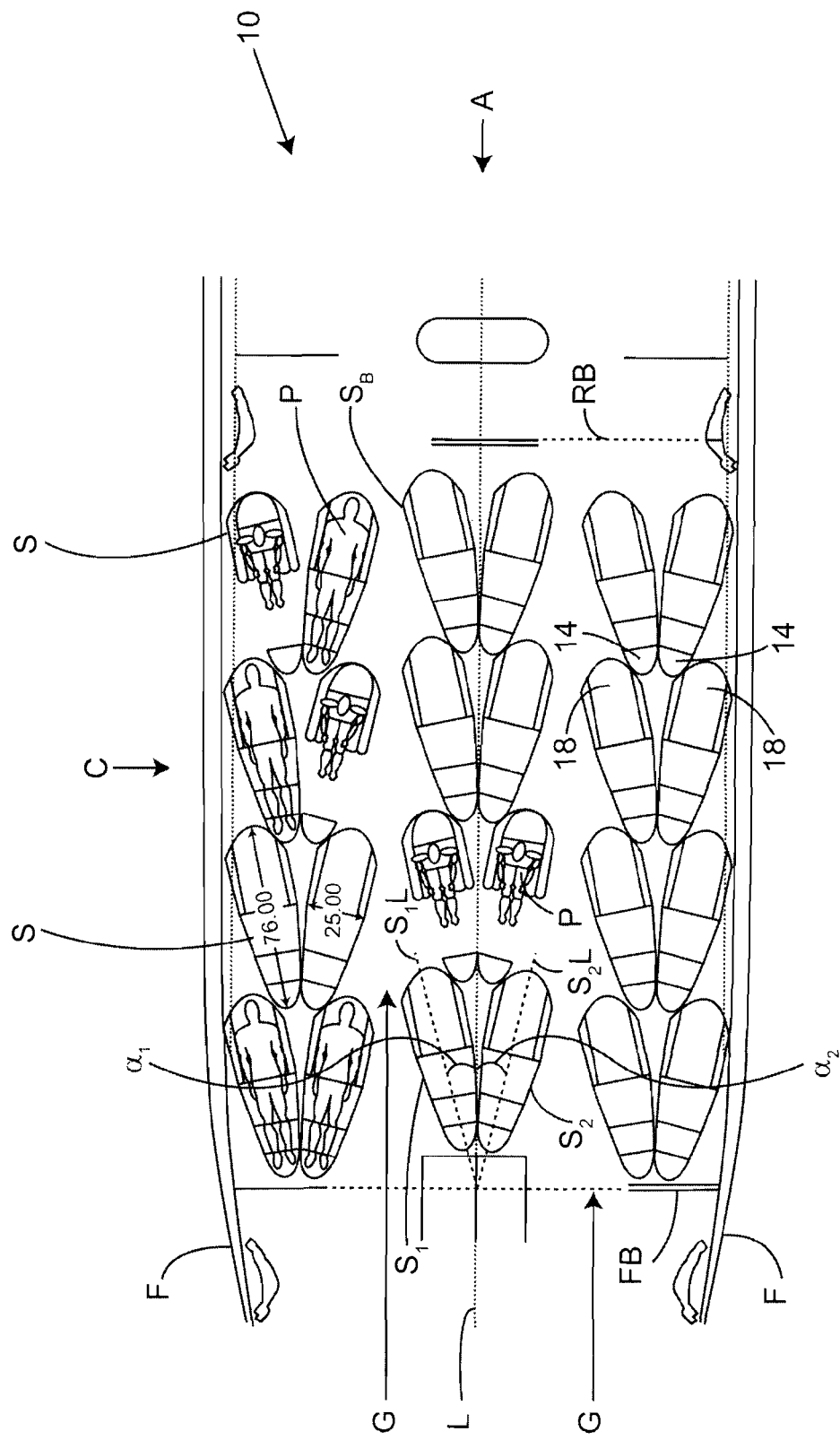
FIG. 1 is a partially-schematicized, top plan view of a first arrangement of seats according to the present invention.

Illustrated in FIG. 1 is first arrangement 10 of seats S consistent with the present invention. Seats S are depicted as positioned within cabin C of a vehicle, such as aircraft A, having a frame, hull, wall, or fuselage F. Seats S support passengers P during travel of aircraft A and, if desired, may convert into beds to facilitate sleeping by the passengers P. FIG. 1 shows various of seats S as extended to form beds $S_B$.

Cabin C typically may define a longitudinal axis L, a forward boundary FB, and a rearward boundary RB. Forward boundary FB frequently is closer to a cockpit of the aircraft A than is rearward boundary RB, although this is not always true. Seats S, further, preferably are oriented within cabin C so that passengers P face generally forward (in the direction of travel) of the aircraft A, although again this orientation may not always be required.

FIG. 1 shows pairs of seats S oriented in columns, with one adjacent set of exemplary seats S identified as $S_1$ and $S_2$ and bisected by axis L. Seat $S_1$ may define a longitudinal axis $S_1L$, and seat $S_2$ may define a longitudinal axis $S_2L$. Axis $S_1L$ may form a positive angle ($\alpha_1$) with axis L; such angle preferably is less than forty-five degrees and more preferably between +10° and +30°. By contrast, axis $S_2L$ may form an opposite (negative) angle ($\alpha_2$) with axis L; such angle preferably is between zero and −45° and more preferably between −10° and −30°. The pair of adjacent seats $S_1$ and $S_2$ thus forms a generally "V" shape when the seats are extended into beds, with feet of passengers positioned at the vertex of the "V".

Three columns of seats S are illustrated in FIG. 1, although fewer or more columns may be present as desired. Similarly, each column is shown as comprising four pairs of seats S, although again fewer or more pairs may be present in any column. Regardless of number, however, each pair of seats S is oriented like seats $S_1$ and $S_2$, with one seat S of the pair defining a longitudinal axis forming a positive angle with an imaginary line parallel to axis L and the other seat S having a longitudinal axis forming an opposite negative angle to axis L.

An advantage of arrangement 10 is that no passenger feet directly abut any aisle or gangway G of cabin C when seats S are extended into beds. Further, arrangement 10 produces a relatively long sleeping area for passengers, as foot ends 14 of pairs of seats S effectively may nest between head end areas 18 of the fore pair of seats. In one presently preferred embodiment of arrangement 10, seats S have seating width of approximately twenty-five inches and provide sleeping length of approximately seventy-six inches.

Figure 2:
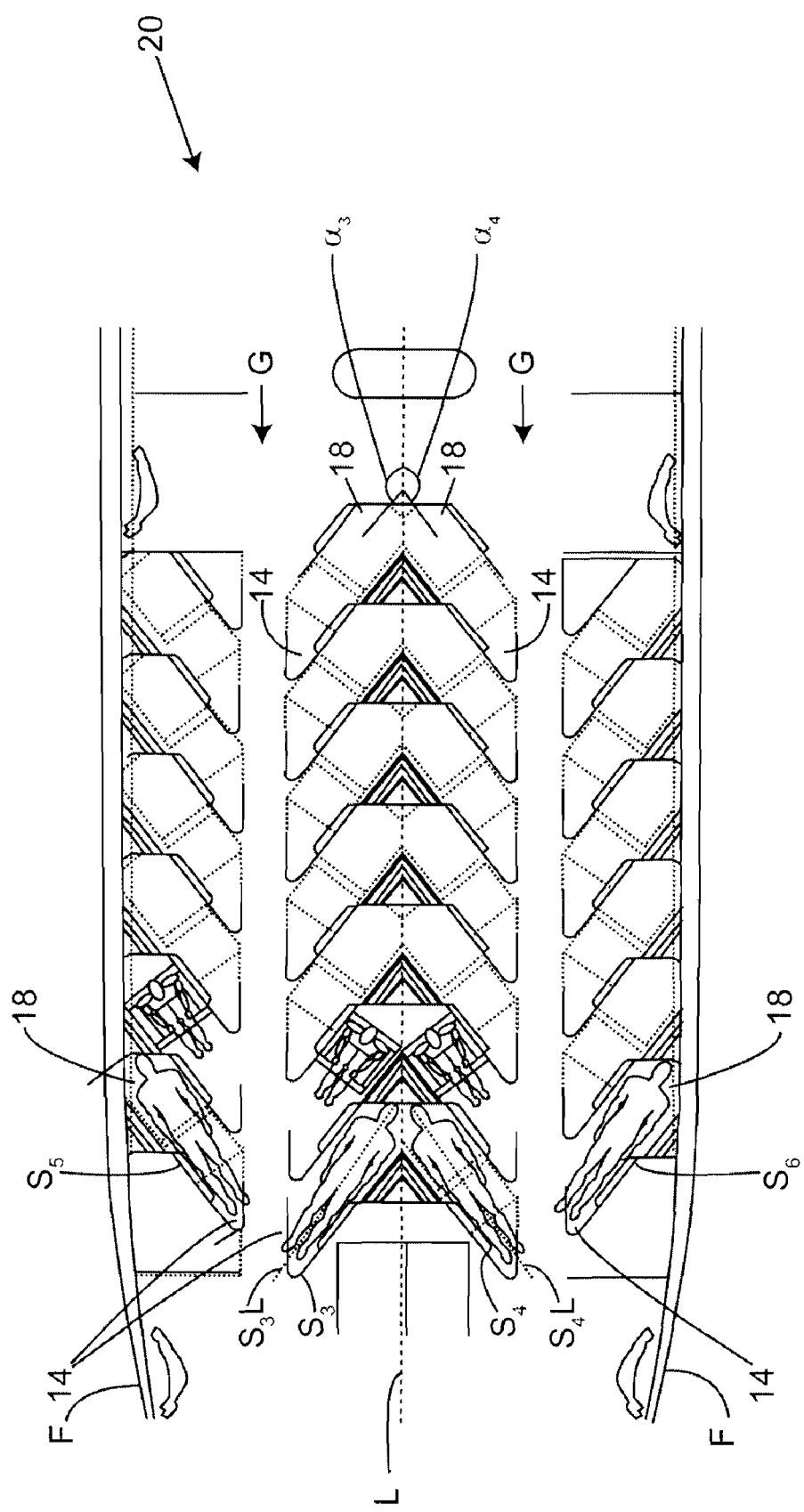
FIG. 2 is a partially-schematicized, top plan view of a second arrangement of seats according to the present invention.

Illustrated in FIG. 2 is arrangement 20 of the present invention. Seats S again are positioned within cabin C with passengers P generally facing forward. However, unlike the multiple columns of "V"-shaped pairs of seats S formed by arrangement 10, seats S of arrangement 20 present a herringbone pattern instead.

Again, though, pairs of seats S may be formed in a column symmetric about axis L, albeit with head end areas 18 of adjacent seats S forming the vertices of the "V" shapes. Foot ends 14, therefore, abut gangways G when the seats are formed into beds. Exemplary seat $S_3$ may define a longitudinal axis $S_3L$ which forms a positive angle ($\alpha_3$) greater than ninety degrees with axis L, with seat $S_4$ defining a longitudinal axis $S_4L$ forming an opposite, negative angle ($\alpha_4$) with axis L. Preferred values for the angle formed by axes $S_3L$ and L are between +90° to +150° (more preferably between +120° to +140°), whereas preferred values for the angle formed by axes $S_4L$ and L are between −90° and −150° (more preferably between −120° and −140°).

The remaining seats S are not paired in arrangement 20, as columns of single seats extend fore to aft along each wall of fuselage F. Nominally starboard seats such as seat $S_5$ are parallel to seats such as seat $S_4$, and nominally port seats such as seat $S_6$ are parallel to seats such as $S_3$. When extended into a bed, seat $S_5$ has its foot end 14 abutting foot end 14 of seat $S_3$ (albeit separated by a gangway G) and seat $S_6$ has its foot end abutting foot end 14 of seat $S_4$ (again albeit separated by a gangway G). Head ends 18 of seats $S_5$ and $S_6$ abut fuselage F. The set of exemplary seats $S_{3-6}$, therefore, resembles a "W," or herringbone, shape as shown in FIG. 2.

An advantage of arrangement 20 is that each seat S may have ready access to aisle or gangway G. A presently-preferred embodiment of arrangement 20, moreover, admits twenty-six seats S within cabin C, increasing the density of the cabin C without sacrificing sleeping area for passengers. In this embodiment, seats S have seating width of approximately twenty-three inches and provide sleeping length of approximately eighty inches.

Figure 3:
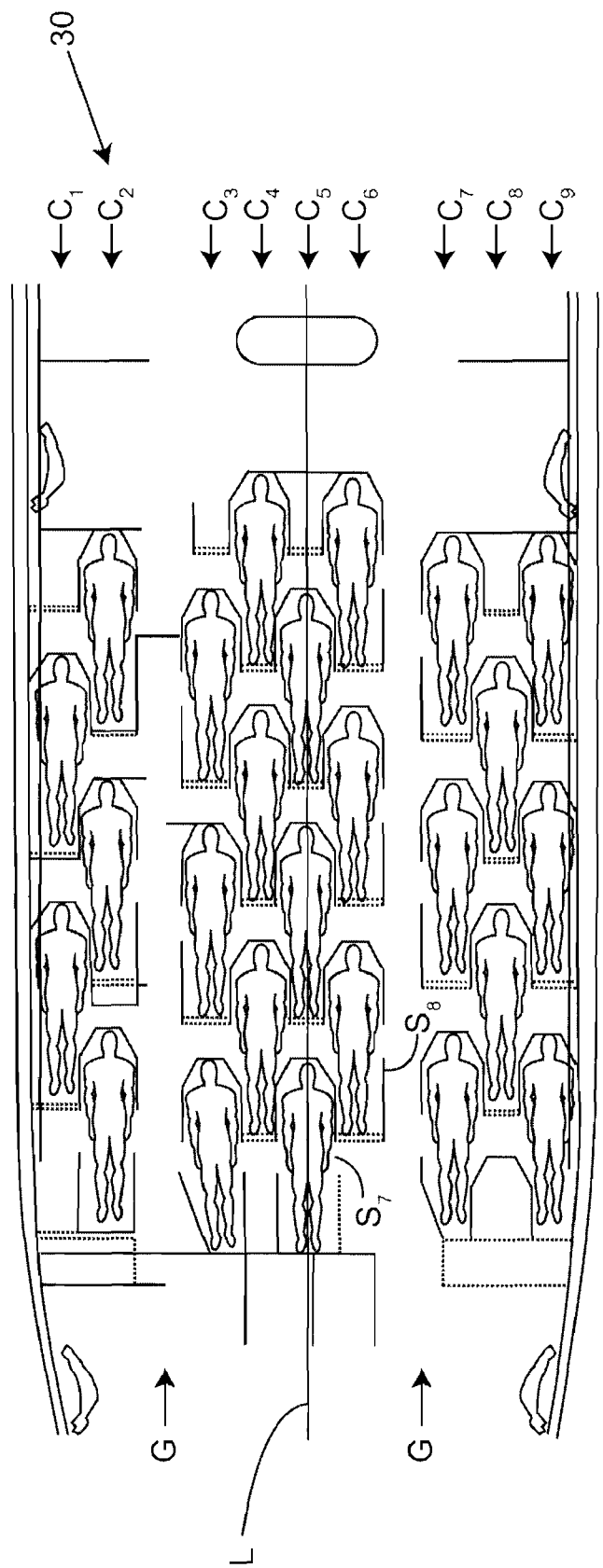
FIG. 3 is a partially-schematicized, top plan view of a third arrangement of seats according to the present invention.

Arrangement 30 of seats S appears in FIG. 3. Unlike seats S of arrangements 10 and 20, seats S of arrangement 30 are not angled relative to longitudinal axis L. Instead, the longitudinal axes of seats S are parallel to axis L, with adjacent seats (e.g. $S_7$ and $S_8$) being staggered along the length of cabin C.

FIG. 3 illustrates nine columns of single seats S extending fore to aft within cabin C. Columns $C_{2-7}$ and $C_9$ preferably each include three seats S, while each of columns $C_1$ and $C_8$ preferably includes two seats S. Of course, those skilled in the art will recognize that each column may include more or fewer seats S instead. Nevertheless, presently preferred in a cabin C containing twenty-five seats S with seating width of approximately twenty-three inches and sleeping length of approximately seventy-nine inches.

Additionally, gangways G no longer are positioned equidistant from axis L. In the version of arrangement 30 shown in FIG. 3, axis L extends through column $C_5$. Accordingly, four columns ($C_{1-4}$) are completely to one side of axis L, while only three columns ($C_{6-9}$) are completely to the other side. Straight gangways G thus cannot be spaced equally from axis L and are placed between columns $C_2$ and $C_3$ and columns $C_6$ and $C_7$.

Figure 4:
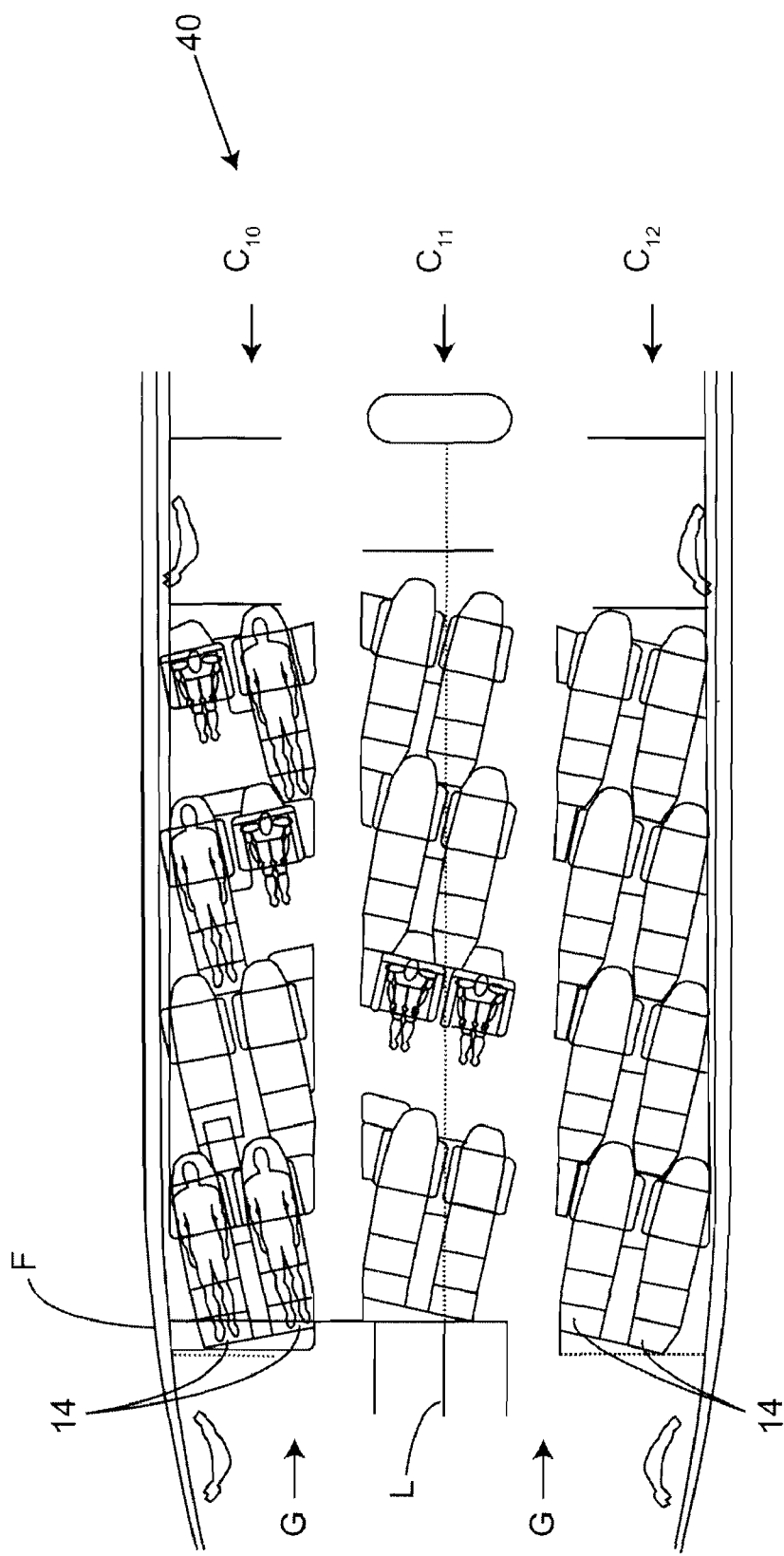
FIG. 4 is a partially-schematicized, top plan view of a fourth arrangement of seats according to the present invention.

Shown in FIG. 4 is arrangement 40 of the present invention. Arrangement 40 comprises pairs of seats S oriented in columns ($C_{10-12}$), with each set of a pair positioned parallel to the other. All seats S, furthermore, are angled relative to longitudinal axis L (or to imaginary lines parallel to axis L).

Foot ends 14 of seats S in respective starboard and port columns $C_{10}$ and $C_{12}$ adjacent fuselage F point inward into cabin C, away from the fuselage F. Consequently, seats in column $C_{10}$ are not parallel to those in column $C_{12}$, instead being angled relative to axis L in opposite manners. Seats S in column $C_{11}$ may be parallel to those of either column $C_{10}$ or column $C_{12}$, with FIG. 4 depicting the seats S of columns $C_{11}$ and $C_{12}$ being parallel. Angles formed between longitudinal seat axes and axis L (or lines parallel to axis L) preferably are less than ±45° and more preferably between +10° and 30°. Presently preferred versions of arrangement 40 include twenty-four seats, each providing a seating width of twenty-five inches and a sleeping length of seventy-five inches.

The foregoing is provided for purposes of illustrating, explaining, and describing embodiments of the present invention. Modifications and adaptations to these embodiments will be apparent to those skilled in the art and may be made without departing from the scope or spirit of the invention.

What is claimed is:

1. An arrangement of seats for passengers of a vehicle having a cabin defining a longitudinal axis, the arrangement comprising (a) adjacent, parallel first and second seats, each seat defining a longitudinal axis angled relative to the longitudinal axis of the cabin, (b) adjacent, parallel third and fourth seats, the third and fourth seats positioned parallel to the first and second seats, and (c) adjacent, parallel fifth and sixth seats, the fifth and sixth seats not positioned parallel to the first, second, third, and fourth seats.

2. An arrangement of seats according to claim 1 in which the vehicle has a fuselage and each of the third, fourth, fifth, and sixth seats is configured for conversion into a bed having a foot end and a head end, the head ends being positioned closer to the fuselage than the foot ends when the third, fourth, fifth, and sixth seats are converted into beds.

3. An arrangement of seats according to claim 1 in which the cabin defines a forward boundary and (a) the first seat extends closer to the forward boundary than does the second seat, (b) the third seat extends closer to the forward boundary than does the fourth seat, and (c) the fifth seat extends closer to the forward boundary than does the sixth seat.

4. An arrangement of seats for passengers of a vehicle having a cabin defining a longitudinal axis, the arrangement comprising (a) paired, parallel first and second seats, each seat defining a longitudinal axis angled relative to the longitudinal axis of the cabin, (b) paired, parallel third and fourth seats, the third and fourth seats positioned parallel to the first and second seats, and (c) paired, parallel fifth and sixth seats, the fifth and sixth seats not positioned parallel to the first, second, third, and fourth seats.

5. An arrangement of seats according to claim 4 in which the vehicle has a fuselage and each of the third, fourth, fifth, and sixth seats is configured for conversion into a bed having a foot end and a head end, the head ends being positioned closer to the fuselage than the foot ends when the third, fourth, fifth, and sixth seats are converted into beds.

6. An arrangement of seats according to claim 4 in which the cabin defines a forward boundary and (a) the first seat extends closer to the forward boundary than does the second seat, (b) the third seat extends closer to the forward boundary than does the fourth seat, and (c) the fifth seat extends closer to the forward boundary than does the sixth seat.

7. An arrangement of seats for passengers of a vehicle having a cabin defining a longitudinal axis, the arrangement comprising:

a. a first column of seats positioned to a first side of the longitudinal axis, transversely adjacent seats thereof being (i) staggered longitudinally within the cabin and (ii) angled relative to a first axis parallel to the longitudinal axis;
  b. a second column of seats positioned to a second side of the longitudinal axis, transversely adjacent seats thereof being (i) staggered longitudinally within the cabin and (ii) angled relative to a second axis parallel to the longitudinal and first axes; and
  c. a third column of seats positioned to the first and second sides of the longitudinal axis, with the longitudinal axis intersecting at least one seat thereof.

8. An arrangement of seats according to claim 7 in which transversely adjacent seats of the third column are staggered longitudinally within the cabin.

9. An arrangement of seats according to claim 7 in which at least one seat of the third column is angled relative to the longitudinal axis.

10. An arrangement of seats according to claim 7 in which each of the first, second, and third columns of seats includes plural rows of seats.

11. An arrangement of seats according to claim 8 in which (a) at least one seat of the third column is angled relative to the longitudinal axis and (b) each of the first, second, and third columns of seat includes plural rows of seats.

* * * * *